United States Patent
Levner et al.

(10) Patent No.: US 7,471,859 B2
(45) Date of Patent: Dec. 30, 2008

(54) PROGRAMMABLE OPTICAL GRATING DEVICE AND METHOD

(75) Inventors: Daniel Levner, Toronto (CA); Martin F. Fay, Providence, RI (US); Jonathan C. Bloch, Boston, MA (US); Jeffrey Weiss, Lincoln, RI (US)

(73) Assignee: Brown University Research Foundation, Providence, RI (US)

( * ) Notice: Subject to any disclaimer, the term of this patent is extended or adjusted under 35 U.S.C. 154(b) by 0 days.

(21) Appl. No.: 11/893,553

(22) Filed: Aug. 15, 2007

(65) Prior Publication Data
US 2008/0050068 A1    Feb. 28, 2008

Related U.S. Application Data

(63) Continuation of application No. 10/949,797, filed on Sep. 24, 2004, now Pat. No. 7,263,258.

(60) Provisional application No. 60/505,787, filed on Sep. 24, 2003.

(51) Int. Cl.
*G02B 6/34* (2006.01)
*H04J 14/02* (2006.01)

(52) U.S. Cl. .............. 385/37; 385/1; 385/2; 385/14; 385/129; 385/130; 385/131; 398/81

(58) Field of Classification Search .............. 385/1, 385/2, 3, 7, 8, 9, 10, 27, 31, 37, 14, 40, 15, 385/16, 129, 120, 131, 130; 398/79, 81
See application file for complete search history.

(56) References Cited

U.S. PATENT DOCUMENTS

| 5,581,642 | A | 12/1996 | Deacon et al. ......... 385/15 |
| 5,652,817 | A | 7/1997 | Brinkman et al. ...... 385/37 |
| 5,732,177 | A | 3/1998 | Deacon et al. ......... 385/122 |

(Continued)

OTHER PUBLICATIONS

Avrutsky et al., "Design of Widely Tunable Semiconductor Lasers and the Concept of Binary Superimposed Gratings (BSG's)", IEEE Journal of Quantum Electronics, vol. 34, No. 4, Apr. 1998, pp. 729-741.

(Continued)

*Primary Examiner*—Brian M Healy
(74) *Attorney, Agent, or Firm*—Dorsey & Whitney LLP

(57) ABSTRACT

An optical waveguide has a surface. An array of separately actuated bodies is disposed proximal to the exposed surface, and an actuator separately actuates at least some of the bodies to change a spectral characteristic of a wave propagating through the waveguide. Preferably, the bodies are metal striplines, an electro-optical material is disposed between the striplines and the exposed surface, and the actuator is a CMOS chip that imposes a voltage to some or all of the lines. The voltage changes the refractive index at the interface with the surface, changing an index of refraction profile of the waveguide and effectively imposing a grating. Alternatively, the bodies are micro-beams and the actuator, also controlled by a CMOS chip, separately moves each micro-beam into and out of proximity to the surface. The grating is programmable via the CMOS chip. The programmable gratings may be used to couple different waves in the same or different waveguides, and may act as Bragg gratings, binary supergratings, or multilevel supergratings.

34 Claims, 3 Drawing Sheets

U.S. PATENT DOCUMENTS

| | | | |
|---|---|---|---|
| 5,781,670 A | 7/1998 | Deacon et al. | 385/10 |
| 5,832,148 A * | 11/1998 | Yariv | 385/16 |
| 6,141,370 A | 10/2000 | Avrutsky et al. | 372/102 |
| 6,415,081 B1 | 7/2002 | Levner et al. | 385/37 |
| 6,567,573 B1 | 5/2003 | Domash et al. | 385/16 |
| 6,657,786 B2 | 12/2003 | Levner et al. | 359/559 |
| 6,987,908 B2 * | 1/2006 | Bond et al. | 385/37 |
| 7,123,792 B1 * | 10/2006 | Mears et al. | 385/37 |
| 7,263,258 B2 * | 8/2007 | Levner et al. | 385/37 |
| 2002/0039463 A1 * | 4/2002 | Degertekin et al. | 385/12 |

OTHER PUBLICATIONS

Avrutsky et al., "Multiwavelength Diffraction and Apodization Using Binary Superimposed Granting", IEEE Photonics Technology Letters, vol. 10, No. 6, Jun. 1998, pp. 839-841.

* cited by examiner

PROGRAMMABLE OPTICAL GRATING DEVICE AND METHOD

CROSS REFERENCE TO RELATED APPLICATION:

This application is a continuation of pending U.S. patent application Ser. No. 10/949,797, filed Sep. 24, 2004, which claims priority to U.S. Provisional Patent Application No. 60/505,787, filed on Sep. 24, 2003, and which is hereby incorporated by reference in its entirety.

FIELD OF THE INVENTION

The present invention relates to waveguides through which optical transmission waves propagate, and gratings for influencing spectral characteristics of those optical waves. It is particularly directed to a grating that is programmable to alter spectral characteristics of the optical wave.

BACKGROUND

In telecommunication, a waveguide is a material medium that confines and guides a propagating electromagnetic or optical wave. In the microwave regime, a waveguide normally consists of a hollow metallic conductor, usually rectangular, elliptical, or circular in cross section. This type of waveguide may, under certain conditions, contain a solid or gaseous dielectric material. In the optical regime, a waveguide used as a long transmission line consists of a solid dielectric filament (optical fiber), usually circular in cross section. In integrated optical circuits an optical waveguide may consist of a thin film that is optically transparent for the wavelengths of interest. Waveguide propagation modes depend on the operating wavelength and polarization and the shape and size of the guide. The present invention is concerned with optical waveguides.

Gratings are optical devices used to achieve wavelength-dependent characteristics by means of optical interference effects. These wavelength-dependent optical characteristics can, for instance, serve to reflect light of a specific wavelength while transmitting light at all other wavelengths. Gratings are usually implemented by modulating (varying) the effective index of refraction of a wave-guiding structure. The variation of refractive index along the length of the grating is often referred to as the "index profile" of the grating. These changes in index of refraction cause incident light to be reflected.

Gratings may be "written" into the optical waveguide in a variety of different ways, depending primarily on the material used. Fiber or glass guides, for example, often make use of photo refractiveness, a property of specially prepared glasses that allows their refractive index to be varied by exposing them to high intensity light (typically in the ultraviolet), termed photo inscription. Semiconductor gratings, on the other hand, are usually implemented as surface-relief gratings by etching a grating pattern into the surface of the semiconductor guide (which may then be buried following subsequent deposition). Etching the surface of the waveguide does not affect the true refractive index of the optical medium as photo inscription does, but rather varies the guide's effective index. Nevertheless, this difference does not affect the operation of the grating.

A simple and common grating device is a Bragg Grating, which consists of a periodic variation in refractive index and acts as a reflector for a single wavelength of light related to the periodicity (known as pitch) of the index pattern. It is frequently used in both semiconductor systems and fiber-optic systems, where it is known as a Fiber Bragg Grating. The Bragg Grating can actually reflect at several wavelengths, corresponding to overtones of its fundamental pitch. However, higher order wavelengths reflected from a Bragg grating tend to be at quite different spectral regions than the fundamental, so Bragg Gratings are not generally useful as a multi-wavelength reflector. Moreover, these higher-order wavelengths cannot be tuned independently of one another.

There are several multi-wavelength grating technologies: analog superimposed gratings, Sampled Gratings (SG), Super-Structure Gratings (SSG) and Binary Supergratings (BSG). The binary supergrating is also known as a binary superimposed grating, for historical reasons. BSG development was originally motivated by a desire to emulate the superposition of multiple conventional Bragg gratings, hence the term "binary superimposed grating". Since then, synthesis techniques have evolved to allow the emulation of arbitrary diffraction characteristics, a flexibility better captured by the term "binary supergrating".

Diffraction gratings in combination with guided light inside waveguides are being used to create novel wavelength division multiplexing (WDM), or to provide wavelength-specific feedback for tunable or multi-wavelength semiconductor lasers. Wavelength Division Multiplexing (WDM) is a technology where many communication channels are encoded into a single optical cable by utilizing different wavelengths of light. Gratings are often used to separate or process these channels. Older grating technologies can process one wavelength at a time, forcing devices intended to process multiple wavelengths to employ a cascade of single-wavelength gratings. This is not an attractive solution because, on top of the additional losses that each grating creates, even a single grating occupies a considerable amount of space by today's standards of integration. It is thus desired to have a single device capable of processing several wavelengths (or ranges of wavelengths) in a space-efficient manner.

Early WDM systems were expensive and complicated to run. However, recent standardization and better understanding of the dynamics of WDM systems have made WDM much cheaper to deploy. The market has segmented into two parts, "dense" and "coarse" WDM. Dense WDM (DWDM) is generally held to be WDM with more than 8 active wavelengths per fibre, with systems with fewer active wavelengths being classed as coarse WDM (CWDM). DWDM in carrier networks promises substantial increases in the capacity of carrier backbones. To avoid the need for multiple lasers, each tuned to a different wavelength, carriers have used tunable lasers such as those noted above, so-called Distributed Feedback lasers or DFBs. First generation tunable lasers could be configured to two or possibly four different wavelengths, whereas newer generation tunable lasers are capable of being tuned over a much wider range of wavelengths and switchable between them at speeds fast enough to route packet-based traffic as optical routers. Tunable gratings have developed alongside tunable lasers, and generally have a fixed pattern whose index is altered by current injection, heating, or the like. However, while those tunable gratings may produce a shift in spectral characteristics (e.g., a phase shift), the spectral response is constrained to a fixed overall shape.

Some research has gone into overlaying single frequency gratings over one another, in order to minimize the physical space taken up by the multiple gratings required for wavelength-specific feedback to tunable lasers. See, for example, *Design of Widely Tunable Semiconductor Lasers and the Concept of Binary Superimposed Gratings*(BSGs), by Ivan A. Avrutsky et al, IEEE JOURNAL OF QUANTUM ELECTRONICS, vol 34, no. 4, April 1998. The above Avrutsky article describes the binary gratings as an array of gratings superimposed analogly, and then subjected to binary digitization according to the desired wavelength. The resulting binary supergrating is a single-depth grating of a constant period. Notwithstanding the advantages offered by the Avrutsky superimposed gratings, there remains a need for enough physical space to dispose multiple iterations of the gratings where more than two channels are present. The addition of more channels will require additional physical space. Further, the very patterning of physical gratings by photolithography or etching is an intricate and expensive manufacturing process requiring a relatively high level of quality control to ensure the grating separates optical transmissions according to the desired wavelength.

What is needed in the art is an optical grating whose interference with an optical wave propagating in a waveguide is selectable. Such a grating would have greatly increased utility if it were small enough to be adapted to semiconductor waveguides.

SUMMARY OF THE INVENTION

This invention is in one aspect a combination device, a waveguide and a grating. The waveguide has at least a first surface. An electro-optic material is disposed over a portion of the first surface, and the electro-optic material has a refractive index that is a function of applied electromagnetic field. A plurality of electrically conductive striplines is disposed such that an electromagnetic field emanating from the striplines influences the refractive index of the electro-optic material. A controller such as a CMOS chip of transistors selectively applies an electromagnetic field to the striplines so as to effect a grating on the waveguide.

A waveguide as used herein is a fixed, optically transmissive body defined by a modal field profile. The modal field profile represents the distribution of light across the waveguide cross-section, and is a function of refractive index profile and wavelength; it is characterized in part by its modal index. The refractive index profile is the refractive index along a cross section of a waveguide that is perpendicular to a direction of wave propagation. While the refractive index may be relatively uniform throughout the majority of that cross section, the index generally shifts near the waveguide surfaces, depending upon the index of refraction of abutting material (e.g., air, transparent cladding). Therefore, a waveguide may include a cladding layer when the modal filed profile extends beyond that cladding layer to include an outward facing surface of that layer. Such a cladding layer is included within the definition of a waveguide even if only an exponential tail of the modal field profile extends into it. The plurality of striplines may be in contact with the electro-optic material, or preferably may be coupled to the electro-optic material through a thin electrically insulating layer.

In another aspect, the present invention is a combination waveguide and grating device, and this waveguide also has at least one first or exposed surface. In this aspect, a plurality of independently movable beams are disposed adjacent to the at least one first surface. An actuator is provided for selectively moving the beams relative to the first surface of the waveguide so as to induce a change in the modal index of the waveguide. Preferably, the beams are moveable into and out of contact with the first surface. Several variations of the actuator are detailed below. The actuator is controlled by any of a variety of control electronics known in the art, preferably a CMOS chip.

In yet another aspect, the present invention is a method for imposing a grating on a waveguide. In the method, an optical waveguide is provided through which an optical transmission wave may propagate. The waveguide has a refractive index profile. A force is imposed on the waveguide to alter the modal index of refraction and thereby change a spectral characteristic of the wave. The force may be an electromagnetic field imposed through conductive striplines and an electro-optic medium disposed between the striplines and the waveguide, or it may be an electrical or mechanical force applied through a plurality of movable beams that are moved relative to a surface of the waveguide so as to influence a modal index of the waveguide. Preferably, the beams are movable into and out of contact with the waveguide surface. The force is changeable, so that removing it causes the refractive index profile (and hence the modal index of refraction) to return to an unaltered state.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

DETAILED DESCRIPTION

Figure 1:
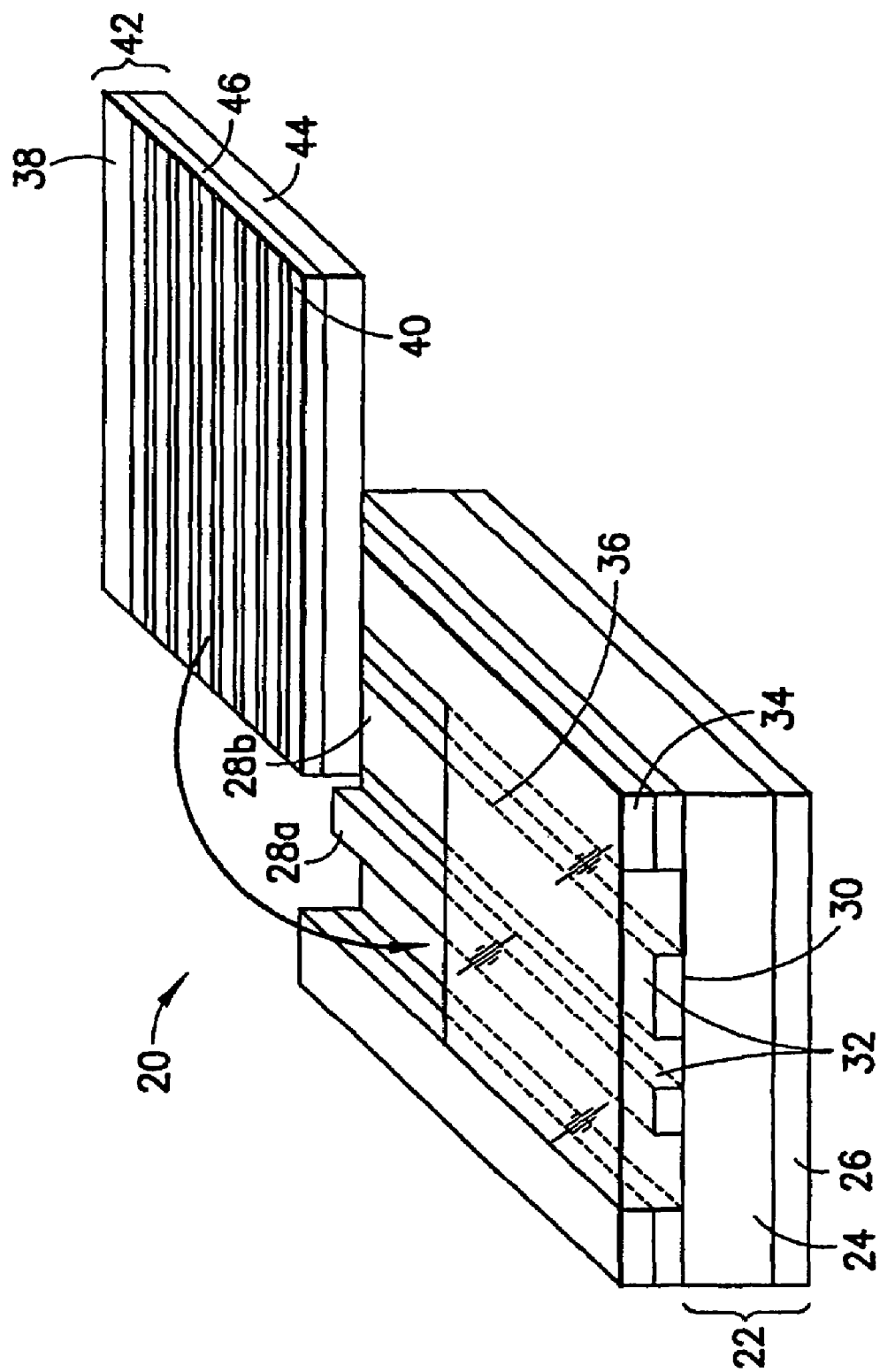
FIG. 1 is an exploded schematic view of a programmable grating made into a waveguide according to the preferred embodiment of the present invention, where two waveguides are shown to depict optical coupling between them.

FIG. 1 illustrates an exploded view of a programmable grating device 20 disposed on a section of an optical waveguide. The optical waveguide is first described. A baseplate 22 such as silicon-on-insulator SOI may include a glass or silicon oxide layer 24 disposed over a substrate 26 such as silicon. One or more waveguides 28a, 28b, are made from an optically transmissive material such as silicon and are supported on the baseplate. Two waveguides 28a, 28b are shown, each defining a base surface 30 supported by the baseplate 22 and exposed surfaces 32. The term exposed surfaces 32 is used to distinguish over another surface of the waveguide that abuts the baseplate 22. The present invention may be used to optically couple spectral characteristics of two (or more) waveguides when disposed as shown in FIG. 1, or to act as a grating on a single waveguide. For simplicity, that single waveguide application is described first, and optical coupling is described in later paragraphs. Optical transmissions move through the waveguides in a general direction that is parallel to the base 30 and exposed 32 surfaces. While the waveguides 28 are illustrated as exhibiting the preferred rectangular cross section, no particular shape is limiting to the present invention. Square or rectangular cross sectional waveguides are more easily fabricated for chip-based applications, which are envisioned as the most promising applications for the present invention, where physical space is at a premium.

Preferably, in such an implementation the waveguides support only a relatively small number of modes, and are typically single-mode in character. For example, waveguides having a silicon core and silicon oxide cladding will typically have widths of about 200-400 nm and a height of about 250 nm, or any value within an order of magnitude of those dimensions. A mode is an electric field envelope which, if present for the pertinent optical frequency, will propagate along a waveguide. A waveguide modes does not depend on the presence of propagating light, only that the mode would be supported by the waveguide if light were present. A given light wave traveling along a waveguide can be decomposed into constituent modal components, i.e. the light wave is equivalent to a superposition of the constituent modal components. In many practical cases, the wave will substantively be in one mode only.

A mode may be considered, for this description, as being specified by the following characteristics: polarization, direction, and order, in addition to the waveguide to which it pertains. Coupling of modes entails changing at least one of those characteristics (generally direction and/or order and/or waveguide) to match that same characteristic of the mode to which it is coupled. Coupling may occur between light of two different modes that are co-or counter-propagating within a single waveguide, or propagating in two different waveguides. Preferably, coupling occurs only within a target frequency range, and not across the entire frequency range of the light. A particular grating might be designed to effect a certain coupling if light were actually present, but the grating is present on the waveguide regardless of whether or not light is present and actually having its mode coupled. That the present gratings are programmable enables them to effect different mode couplings, depending upon how they are programmed and the resultant grating they effect on the waveguide."

Alongside the waveguides 28 and spaced therefrom are spacers that extend from the baseplate 22 to a height somewhat greater than that of the waveguides 28. For ease of fabrication, the spacers preferably extend about 1.5 to 2.0 microns above the waveguide exposed surface 32 that is opposite the base surface 30. Advances in nanoscale fabrication, unrelated to this invention, may make it practical to substantially lower that figure. Disposed about the exposed surfaces 32 of the waveguides 28 is an electro-optic material 36. The term electro-optic material as used herein includes any material or medium whose refractive index is influenced by an applied electromagnetic field. Electro-optic materials include those materials classed as electro-optic, electro-chromic, electro-absorptive, magneto-optic, magneto-chromic, magneto-absorptive, thermo-optic, thermo-chromic, piezo-electric, non-linear-optic, and current-sensitive optical materials. Preferably, the electro-optic material 36 is a liquid crystal or an electro-optic polymer. The electro-optic material is disposed about at least one of the exposed surfaces 32 of the waveguide and laterally retained by the spacers 34. Additional spacers (not shown) may be imposed to retain the electro-optic material along the longitudinal axis of the waveguide 28. The spacers 34 may or may not form a complete seal to retain the electro-optic material, and certain embodiments need not include such spacers 34, as where the electro-optic material is sufficiently viscous or solid so that the spacers are unnecessary.

Coupled to at least one exposed surface 32 of the waveguide 28 through the electro-optic material 36 is an actuator 38 for applying an electromagnetic field thereto. Preferably, the actuator 38 includes a series of metal or other electrically conductive striplines 40 that are substantially parallel to one another and disposed on an insulating body 42 that may be multi-layered, such as a silicon substrate 44 spaced from the striplines 40 by a glass layer 46. Typically, many more layers of insulation having selective conductive pathways through them leading to each of the striplines 40 would be present. The striplines 40 are preferably perpendicular to the longitudinal axis of the waveguide 28, or at least disposed to define some angle therewith. The electromagnetic force or field is applied by the striplines via a controller such as an integrated circuit chip, CMOS chip, or the like, that selectively provides a voltage to some or all of the striplines, or different voltages to the different striplines. Said voltages and fields may be DC (constant) or AC (oscillatory) in character, depending on the preferred configuration for the electro-optical material in question.

Where the actuator 38 is disposed on an insulating body 42 separate from that of the waveguide 28, the two separately manufactured components maybe flip-chip bonded to one another as shown schematically in FIG. 1, where the insulating body 42 is supported upon and bound to the spacers 34. In certain embodiments, an adhesive such as glue with entrained glass bead spacers may act as the spacers 34, disposed in a manner so as to not contact the waveguide. Alternatively, the actuator 38 (the striplines 40) may be integrated directly onto or into the electro-optic material 36 in sequential processing steps operating on the same baseplate 22.

The actuator 38 applies a voltage through the individual striplines 40 to the electro-optic material, locally changing its index of refraction and hence the modal indices of the waveguide. This is true because although the described electro-optic material 36 is not within the confines of the waveguide 28 itself, the waveguide does not completely contain the optical wave. Whereas the optical transmission wave propagates chiefly within the core of the waveguide 28, certain remnants of it 'leak out', which are herein termed an evanescent wave that derive from the original optical wave being communicated through the waveguide 28 itself (i.e., along its surface). Where two or more waveguides 28a, 28b are (at least partially) enveloped by a common deposition of electro-optic material, there is generally little coupling between the different evanescent waves except where facilitated by a grating. Typically, where waveguides are optically identical, a strong coupling will occur even without a grating. The present invention effects coupling with waveguides that are optically asymmetric. Optically asymmetric waveguides are those having different optical properties, such as different modal indices of refraction. This may be evident by different dimensions, different prior art gratings (where the gratings of the present invention are used in conjunction with another prior art grating), or different propagation media that make up the waveguides. The application of an electric field to the electro-optic material 36 changes the index of refraction of that material 36. Because the propagating wave encompasses the interface between the surface 32 of the waveguide 28 and the electro-optic material 36, its spectral properties may be controlled by modulating the electric field applied via the striplines 40. Whereas the electro-optic material 36 is illustrated in FIG. 1 as bulky, it need only be a cladding layer about the surface 32 of the waveguide 28. In the case of two waveguides 28a, 28b, coupling may be effected between waves with particular optical frequencies by providing a grating which compensates for the phase mismatch between the waveguides for said optical frequencies.

Changes to the spectral characteristics of the propagating wave by the programmable grating are not merely shifting of phase or scaling of amplitude. More fundamental changes may be imposed such as changing the optical phase and amplitude of the optical wave in a wavelength-selective fashion. Preferably, the striplines 40 are driven by an array of programmable CMOS transmission gates to provide an AC or DC field to the electro-optical material 36. By programming the CMOS electronics differently, different diffraction gratings may be electrically imposed on the evanescent field and consequently on the optical transmission wave within the waveguide 28. In a traditional physical supergrating, a single interference line imposes a minimal change to an optical wave with which it interferes, but a plurality of them acting in concert can fundamentally change the optical characteristics of the wave. Similarly, in the present invention each stripline 40 effects a small change, but the net effect of a plurality of striplines 40 operating in conjunction with one another can effect a more substantial change, in either forward-going or reverse propagation modes of the optical transmission wave within the waveguide 28. While the striplines 40 themselves do not physically interfere with the wave as an etched line of a traditional supergrating, the net effect of the electric field imposed by each stripline 40 is analogous to the etched lines of a physical supergrating. Thus the present invention is effectively a supergrating. Where the striplines 40 are controlled by programmable CMOS electronics or other programmable actuator 38, the present invention is a programmable supergrating.

In a variation on the preferred embodiment, a prior art "physical" grating is also disposed within or on the waveguide 28 itself as in the prior art, preferably a prior art binary supergrating that is etched or lithographed into the waveguide 28. An electric field imposed by the actuator 3 8 and striplines 40 changes the optical transmission wave as above, which itself changes the effect of the prior art supergrating. This is because the optical wave on which the prior art physical supergrating acts is itself spectrally altered by the programmable supergrating of the present invention. Said another way, the programmable supergrating of the present invention changes the spectral response of the waveguide 28. An optical wave propagating through it, whose spectral property would change from x to y due to the prior art etched/lithographed grating, now changes from x to y', based on the change to the prior art grating that the grating of the present invention effects. The preexisting physical supergrating within the waveguide 28 interferes differently in the presence of the present programmable grating. The difference in spectral response may be, for example, changes in optical phase, polarization, or power. The difference between y and y' is not limited merely to a shift in phase, but y' may be a completely new phase.

Figure 2A:
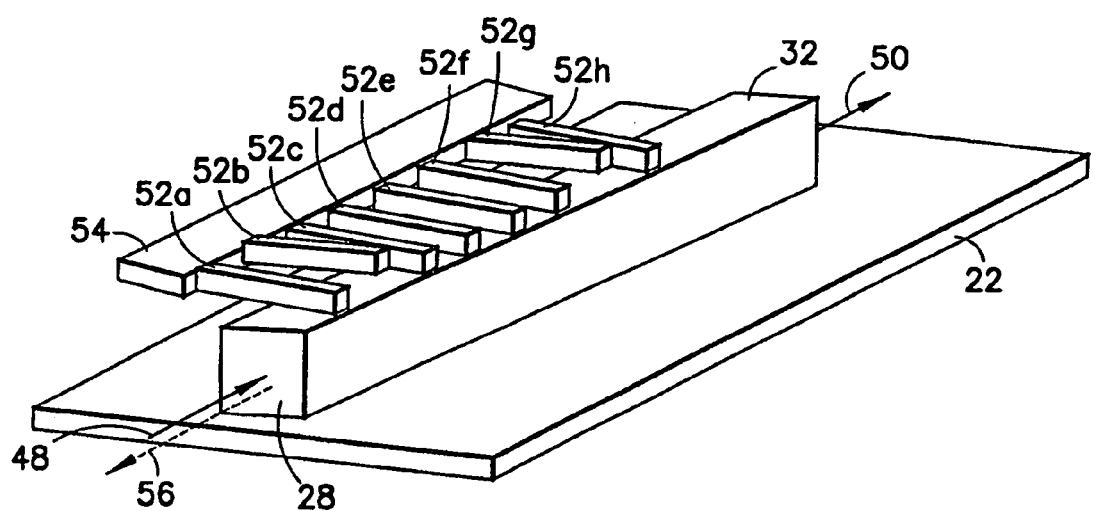
FIG. 2A is an exploded perspective view of a programmable grating made into a waveguide according to a first alternative embodiment of the present invention.
Figure 2B:
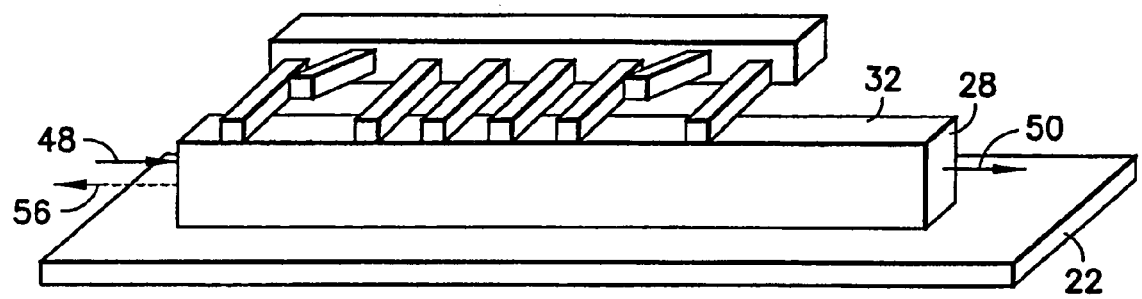
FIG. 2B is similar to FIG. 2A but from a different perspective.

A first alternative embodiment of the present invention is illustrated in FIGS. 2A and 2B, collectively referred to as FIG. 2 as they merely illustrate different perspectives of the same embodiment. In this first alternative embodiment, a micro-electrical mechanical system (MEMS) is used to effect a change to the transmission wave passing through the waveguide 28. MEMS generally refers to systems that operate with very small mechanical components. Whereas MEMS often is used to refer to components of the micrometer scale, as used herein, MEMS refers to systems with operating components of the micrometer scale and smaller, including nanoscale. MEMS components are typically manufactured using planar processing such as semiconductor photolithography. These devices are commonly fabricated using modified silicon fabrication technology (e.g., electronics), molding and plating, electro discharge machining, and other technologies capable of manufacturing very small devices. MEMS components are known in bubble ejection for inkjet printers (piezoelectric elements), remote sensors in industry and medicine, and mico-mirrors for physically redirecting an optical wave in optical switching applications, among many others. The present invention uses MEMS to effectively impose a grating on an optical wave passing through a waveguide.

Like reference numbers between FIGS. 1 and 2 indicate like components. A waveguide 28 is disposed on a baseplate 22, and a transmission wave 48 propagates along a forward mode 50. A series of physically moveable members, such as (micro-) beams 52a-h are selectively movable relative to a surface 32 of the waveguide 28 so as to influence the modal index of the waveguide. Preferably, the beams 52a-h are movable into and out of contact with the surface 32. The beams 52 are disposed substantially parallel to one another and at an angle to the longitudinal axis (parallel to the forward propagation mode 50) of the waveguide 28, preferably perpendicular to that axis. Where the underlying waveguide 28 is rectangular or otherwise defines a substantially planar exposed surface 32, the beams 52 are preferably disposed to cross an entire lateral extent of that exposed surface 32 as shown in FIG. 2. The beams are selectively moved by a MEMS actuator 54 that brings individual ones of the beams 52 into and out of contact with the surface 32 of the waveguide 28. The beams may be conceptualized as being analogous to keys of a piano, each cantilevered to make contact or to break contact with the piano strings (the piano strings being conceptually analogous to the waveguide 28). As illustrated in FIG. 2, the second 52b and seventh 52g beams are not in contact with the surface 32 of the waveguide 28 and the remaining beams 52a, 52c-f and 52h are in contact with the subject surface 32. As with the preferred embodiment, the series of beams 52 operate in concert with one another to produce a desired spectral change in the transmission wave 48 passing through the waveguide 28. The net effect of the plurality of beams 52 is to effect a grating, which may be a supergrating or a binary super grating, on the transmission wave 48.

The beams 52 may be made of silicon, poly-silicon, other semiconductor (possibly amorphous), nanocrystalines, dielectrics, metals, or any combination thereof The beams 52 may be cantilevered at an end as shown, at an intermediate position between two opposed ends, or fixed at both opposed ends and moved into and out of contact with the surface 32 in a non-rotational manner. The beams may also be moved into and out of contact with the subject surface by flexing, though this is seen as less than optimal given known implementations.

The MEMS actuator 54 preferably moves the beams 52 electronically by the application of a charge, where a resulting electrostatic attraction or repulsion actuates the beams 52 individually. Specifically, application of an electric charge to individual ones of the beams 52 causes one or the other end (if cantilevered at an intermediate position between ends) of the beam 52 to move toward or away from the baseplate 22 due to attraction to or repulsion from that baseplate, or due to attraction to or repulsion from a body (similar to 42) on which the MEMS actuator 54 is built if flip-chip construction is employed. Alternatively, application of charge to the baseplate or substrate may be imposed that would cause all the beams to displace (e.g., no additional potential imposed by the actuator 54), and the MEMS actuator 54 operates to prevent selected beams from displacing so that it is selectable for each beam to be in or out of contact with the surface, and thereby the grating is programmable via the actuator. Other means by which the MEMS actuators 54 may displace the beams 52 include piezoelectric, thermal, magnetic, acoustic, chemical, and optical means. In any event, the beams are mechanically moveable between a contact position and a non-contact position with the exposed surface 32 of the waveguide 28. Preferably, the MEMS actuator 54 is controlled by a programmable device such as a CMOS chip so that the effective grating imposed by the MEMS beams 52 on an optical transmission wave passing through the waveguide 28 is also itself programmable.

Concerted actuation of the beams 52 is used to change the spectral characteristics of the optical transmission wave, including changing the optical phase, polarization, and power of the optical wave. As with the preferred embodiment, a physical grating may also be disposed within or on the waveguide 28 itself as in the prior art, preferably a prior art binary supergrating that is etched or lithographed into the waveguide 28. Actuation of the beams 52 changes the optical transmission wave as above, which itself changes the effect of the prior art supergrating by altering the transmission wave on which that prior art physical grating interferes. The present invention itself imposes a grating (supergrating or binary supergrating), and may also work in concert with another prior art grating. The grating imposed by the present invention can be used to direct some or all light within a waveguide 28 or between waveguides 28a, 28b (FIG. 1), including forward 50 and backward 56 propagation modes. The present invention may also be used to effect coupling in a wavelength-dependent manner.

Like the actuator 38 of FIG. 1, the MEMS actuator 54 may be constructed on a separate substrate and flip-chip bonded to a baseplate 22 on which the waveguide 28 is disposed, or may be fabricated in sequential processing steps on that same baseplate 22 or even built into the waveguide 28 itself.

The programmable grating of the present invention may also be used to couple a spectral characteristic between one or more pairs of optical transmission waves of different modes within a single waveguide 28. This is shown schematically at FIG. 3 and described below.

This coupling may be between electric (TE) and magnetic (TM) polarizations (TE-TM coupling), or coupling between different order modes (e.g., phase, polarization, amplitude in forward or reverse propagation). The coupling may be wavelength dependent, that is, only affecting a certain portion of the wavelength spectrum, and may be fixed or programmable. [As the true wavelength depends upon the transmission medium and its index of refraction, it is understood that the wavelength band affected by any grating depends upon a common reference for wavelength, usually taken to be free-space wavelength.] Additionally, the coupling may optionally control optical phase, polarization and power. Similarly, the grating may also de-couple modes of a coupled optical transmission wave. In the coupling/decoupling embodiment, the inventive programmable grating need not be a supergrating. The inventive grating may be used to compensate for chromatic dispersion or polarization mode dispersion, it may modulate an optical wave to add or drop one of the modes of an already coupled wave, it may provide variable optical attenuation, optical channel equalization, dynamic gain equalization, optical power splitting or optical power merging.

Figure 3:
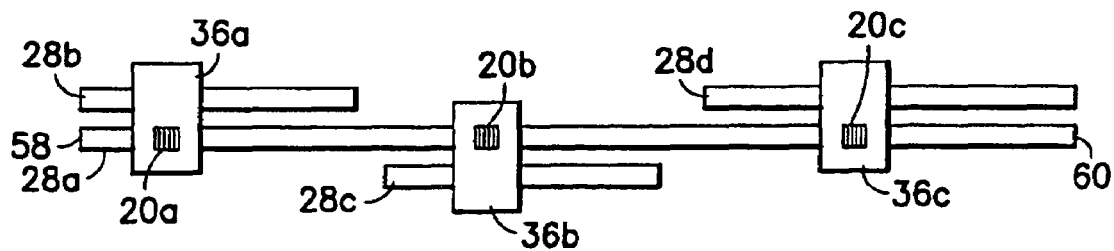
FIG. 3 is a schematic diagram showing coupling of optical transmission waves between different modes of different waveguides using the present invention.

The programmable grating of the present invention may also be used to couple optical transmission waves from two or more waveguides 28a, 28b as illustrated in FIG. 3. A first 28a, second 28b, third 28c, and fourth 28d waveguide each support one or more modes, with modal refractive indices which generally differ between adjacent waveguides. Assume that an optical wave passes through the first waveguide 28a, propagating from a first end 58 toward a second end 60. A first deposition of electro-optic material 36a overlies surfaces of each of the first and second waveguides 28a, 28b, and a first grating 20a according to the preferred embodiment is disposed over the first waveguide 28a as shown. Assume that the modal indices of the first 28a and second 28b waveguide differ, there will therefore be a phase mismatch, so that in the absence of the present grating substantively no coupling will occur from one waveguide to the other.

The programmable first grating 20a imposes a grating to provide phase-matching between a mode of the first guide 28a and a mode of the second waveguide 28b, thereby facilitating wavelength-selective power transfer from one to the other. This "phase mismatch" stems from the fact that light of like optical frequency passing through modes of differing modal index will have different wavelengths (within their respective waveguides, as distinct from free-space wavelength, which remains matched). Therefore, with no grating present, little light will couple from one mode to the other, because any light crossing from one to the other quickly finds itself out of phase with its companion on the original waveguide. For the right optical frequencies (or free-space wavelengths), a grating produces scatterings which encourage coherent coupling. This phase-matching between waves in the first 28a and second 28b waveguides is frequency-selective, so that light will couple from the first waveguide 28a to the second waveguide 28b only at selected frequencies (termed a first frequency band; said selected frequency band can be non-contiguous). The resulting power transfer can be complete (all light coupled from one mode to the other) or partial (only some light coupled). Light at other frequencies will not couple from one mode to the other. Programming is preferably done via CMOS electronics that drive the actuator of the respective grating 20a.

At a second deposition of electro-optic material 36b, similar CMOS electronics are used to impose a different second grating 20b that couples between modes of the first and third waveguides 28a, 28c in a second frequency band. Similarly, a third deposition of electro-optic material 36c imposes a different third grating 20c that couples between the first and fourth waveguides 28a, 28d in a third frequency band. Any of the waves propagating through the second through fourth waveguides may propagate in a different direction from that in the first waveguide 28a, yet still be coupled as above within a selected frequency band. In this manner, coupling of modes between waves in different waveguides may be obtained with the present invention. The gratings 20a, 20b, and 20c operate as passive filter elements, with certain characteristic filter responses. Light can be launched on any or all of the waveguides, at any wavelength(s), and in either direction. How light couples from the modes of one waveguide to those of another depends on the filter function being provided by the gratings—if modeled as a transfer function, the output will be something akin to the product of the input spectrum and the spectral filter response. Thus light at certain wavelengths will couple (whether fully or partially) from one waveguide mode to another, and light at other wavelengths will remain on the original guide. Likewise the grating can impose group delay (which is related to phase) in a wavelength-selective fashion.

In this capacity, it acts as an inter-waveguide coupler and can be programmed for different order modes or different-direction gratings, or any of the applications noted above for the intra-waveguide coupler. When two waveguides are disposed near one another, such as within a common volume of electro-optic material 36 (FIG. 3) or merely adjacent in air for the embodiment of FIG. 2, waves propagating in the different guides 28a, 28b each define a propagation vector and generally a different propagation constant. When used as an inter-waveguide coupler, the inventive grating can be used to couple an optical transmission wave propagating in modes of the waveguides to a new optical transmission wave that is some combination of the available waveguide modes, allowing the inter-waveguide coupler to operate using two or more separate waveguide inputs. In this manner, the programmable grating acts as a mode mixer. Optionally, a second mode-mixing grating device that may be different from the first can be added, allowing inputs from many waveguides and a corresponding increased number of mixed-mode wave outputs. Any number of the waveguides that carry the original optical transmission wave that is input to the mode-mixing grating may also carry the output mixed-mode transmission wave, a particularly advantageous result for mixing waves that originally propagate in different directions. One or more programmable mode-mixing gratings may operate on inputs, and another grating device may provide the net output wave of the overall process where mixing is done in multiple stages by multiple gratings. Where a plurality of waveguides provide inputs and the net output is among less than that plurality of waveguides, some power splitting among the output waves is necessary.

The intra-waveguide coupling device can be used to direct some or all light within a waveguide or couple one or more spectral characteristics between waves of different modes, including any of their propagation modes (e.g., as characterized by polarization, direction, order), and may afford optionally control of optical phase, polarization and power. As with the inter-waveguide coupler, coupling may be effected in a wavelength-dependent manner, and it may be used to compensate for chromatic dispersion or polarization mode dispersion, it may modulate an optical wave to add or drop one of the modes of an already coupled wave, it may provide variable optical attenuation, optical channel equalization, dynamic gain equalization, optical power splitting or optical power merging.

Figure 4A:
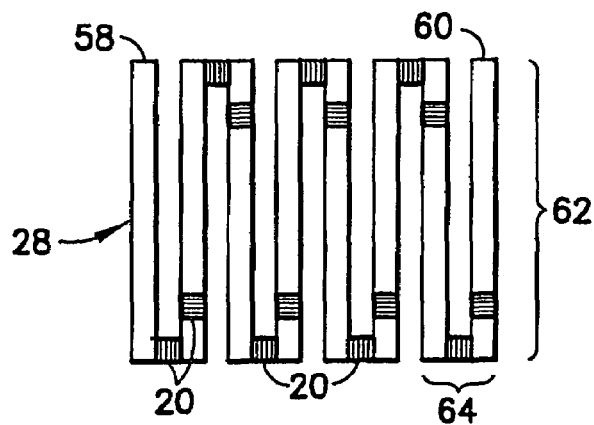
FIG. 4A is a schematic diagram of a serpentined waveguide with gratings disposed following every bend of the waveguide.
Figure 4B:
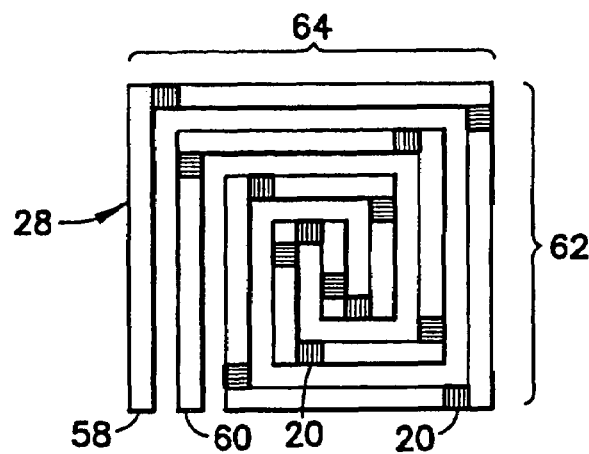
FIG. 4B is a similar to FIG. 4A but showing a different layout for the waveguide.

It is known in the art to fold or serpentine waveguides of small cross section to more efficiently use the available physical space on a silicon chip. FIGS. 4A and 4B illustrate such serpentined waveguides, wherein FIG. 4A shows opposed ends 58, 60 of the waveguide 28 lying at opposed ends 58, 60 of the physical area over which the waveguide is disposed, and FIG. 4B shows a spiral folding where the opposed waveguide ends 58, 60 are adjacent to one another. While squared corners and perpendicular angles are shown, a waveguide generally exhibits an arcuate segment or elbow between straight segments 62, 64 that are themselves parallel or perpendicular to one another, to more efficiently conduct the optical wave. Regardless of the elbow radius of curvature, at every significant change in waveguide direction (significant being at least a 45° change in direction over a length that is no more than fifty times the width of the waveguide), the effective cross section of the waveguide 62 is diminished such that the resulting optical pathway causes a phase shift in the optical transmission wave passing through it.

Because the optical transmission wave may undergo some phase-shifting due to a significant change in direction between waveguide sections 62, 64, especially when the transitions between different sections 62, 64 of the waveguide 28 are at acute or substantially perpendicular angles to one another, it is desirable to impose some phase correction at each of these direction changes. The present invention is particularly well adapted for such an application as the inventive grating 20 is programmable, and therefore adaptable to the different phase shifts that may be incurred at different bends and experienced by different optical waves at identical bends. The present programmable grating 20 may be imposed adjacent to each such significant change in direction, shown particularly at FIGS. 4A and 4B. Similarly, the programmable grating 20 may be imposed at each serpentined bend of a waveguide 28, or some combination of straight and arcuate portions of the waveguide. The programmable gratings may be imposed to alter a wave propagating through a single waveguide, or may be imposed to couple wave spectral characteristics of one wave propagating through one waveguide to that of another wave propagating through a separate waveguide. Preferably, such coupling is within only one or more certain frequency bands, and other spectral characteristics apart from the target frequency bands remain unchanged.

Where an optical transmission wave passes into a first waveguide end 58 and exits an opposed second waveguide end 60 in the forward propagation mode, the present gratings effect the phase correction after a phase shift caused by the bend occurs. For the reverse propagation mode, the present gratings 20 may effect the change in phase prior to the bend in anticipation of the phase shift due to the bend. The inventive gratings 20 may also be disposed at the portion of the waveguide where the significant direction change occurs (e.g., the arcuate portion or segment that couples the straight sections of different directions), and effectively alter the characteristics of the waveguide in that region, thereby avoiding unwanted phase shift that would otherwise occur in the absence of the grating 20.

The gratings 20 imposed on a serpentined or folded waveguide maybe used to effectively control the relative accrued phase of two or more optical wave modes propagating through the waveguide 28. Accrued phase is the net phase of different modes, and preferably accrued phase is kept as near as possible to zero, indicating that the phases (at least in a target band of wavelengths) of the two different modes are matched. This may be done by locally varying the dimensions, shape or refractive index values of a segment of the waveguide via the inventive grating, whether that segment on which the grating is disposed is an arcuate segment that joins straight segments 62, 64, or the straight segment 62, 64 itself. For example, assume that a waveguide supports two modes. The programmable grating is programmed so that an accrued phase between the modes, within a selected frequency band, is maintained at a constant differential, preferably zero, for the co- or counter-propagating modes. Ideally, whether the grating(s) 20 are imposed on a straight or an arcuate section of a serpentined waveguide, the gratings are programmed to ensure the aggregate phase delay through the length of the overall device is identical for one waveguide versus another adjacent waveguide at every frequency of interest.

The spatial-frequency Fourier spectrum of gratings according to the present invention exhibits two characteristics that differ from certain of the prior art gratings (such as those disclosed in U.S. Pat. No. 6,1412,370 to Avrutsky et al.): a) "clean" spectral regions, that are either devoid of spectral content or contain suitably engineered spectral features that have some resemblance in character (smoothness, for example) or relation to the intended grating response; and b) "noisy" spectral regions that are either random-seeming or resemble noisy versions of the intended grating response. Gratings according to this invention may be considered "DSM-style" Supergratings, a particular class of supergratings that can be designed by the Delta-Sigma Modulation (DSM) method of co-owned U.S. Pat. Nos. 6,415,081 and 6,657,786, each of which is herein incorporated by reference. As such, the DSM method of those co-owned patents affords a simple and direct means to identify supergratings of this invention over other types of gratings. Other design methods may also be used to quantize the gratings and the specific programming inputs of the present invention.

While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A combination waveguide and grating comprising:
    a waveguide comprising a first surface;
    an electro-optic material disposed over a portion of at least the first surface, said electro-optic material having a refractive index that is a function of applied electromagnetic field;
    a plurality of electrically conductive striplines disposed over the electro-optic material such that an electric field emanating from the striplines alters an index of refraction of the waveguide via the electro-optic material; and
    a controller for selectively applying a voltage to the striplines so as to effect a grating on the waveguide by altering an index of refraction of the waveguide.

2. The combination of claim 1 wherein at least one spectral characteristic of an optical transmission wave passing through a portion of the waveguide adjacent to the electro-optic material is a function of a voltage applied to the striplines.

3. The combination of claim 1 further comprising at least one optical supergrating coupled to the portion of the waveguide over which the electro-optic material is disposed.

4. The combination of claim 1 wherein the electro-optic material comprises one of liquid crystal and electro-optic polymer.

5. The combination of claim 1 wherein the waveguide and the striplines are fabricated on a common substrate.

6. The combination of claim 1 wherein the waveguide and the striplines are coupled to facing surfaces of opposed substrates.

7. The combination of claim 6 wherein the opposed substrates are each bonded to opposed ends of at least one spacer.

8. The combination of claim 1 wherein the waveguide is disposed over a silicon-on-insulator baseplate.

9. The combination of claim 1 wherein the controller comprises a programmable electronics chip capable of applying different voltages to the plurality of striplines.

10. The combination of claim 1 wherein the electro-optic material and the striplines are disposed over an arcuate portion of the waveguide.

11. The combination of claim 1 wherein the plurality of striplines comprise an array of substantially parallel striplines disposed to cross a longitudinal axis of the waveguide.

12. The combination of claim 1 wherein the said waveguide is a first waveguide, the combination further comprising a second waveguide comprising a second surface over which the electro-optic material is disposed.

13. The combination of claim 12 wherein the plurality of striplines operates to couple light propagating in a mode of one of the first and second waveguides to another mode of the first and second waveguides.

14. The combination of claim 1, wherein the waveguide comprises an arcuate section and supports propagation of at least two modes, the plurality of striplines for controlling a relative accrued phase between two of the modes by modulating the electro-magnetic field applied thereto.

15. The combination of claim 14 wherein the accrued phase is substantially zero due to the electro-magnetic field applied to the striplines.

16. The combination of claim 14 wherein controlling a relative accrued phase comprises varying at least one of a dimension and an index value of an arcuate section of the waveguide.

17. The combination of claim 1 characterized by a spatial-frequency Fourier spectrum of the combination that exhibits clean spectral regions for a wavelength band of interest, and noisy spectral regions elsewhere.

18. A method for imposing a grating on a waveguide comprising:
    providing a first optical waveguide comprising a first surface and having one or more first modal indices of refraction;
    providing a second optical waveguide comprising a second surface and having at least a second modal index of refraction;
    selectively altering the modal indices of refraction of the first optical waveguide by imposing a force at a distance from the first surface so as to effect a grating and effect coupling between the first and second optical waveguides; and
    removing the force so that the modal indices of refraction returns to an unaltered index;
    wherein the act of imposing the force comprises selectively moving at least some beams of an array of beams relative to the surface.

19. The combination of claim 1, wherein the electro-optic material is disposed outside of the waveguide.

20. The combination of claim 1, wherein the controller is configured to apply at least one voltage to a selected plurality of the plurality of striplines, the selected plurality determining characteristics of the grating.

21. A means for processing optical signals comprising:
    a means for transmitting optical waves;
    a means for encasing at least a portion of the transmitting means disposed outside the transmitting means and having a variable index of refraction;
    a plurality of means for selectively altering an index of refraction at discrete locations within the encasing means proximate the transmitting means; and a means for controlling each of the plurality of index of refraction altering means so as to effect a grating proximate the transmitting means.

22. The processing means of claim 21, wherein the means for transmitting optical waves is a first means for transmitting optical waves, the processing means further comprising:
    a second means for transmitting optical waves;
    wherein the encasing means further encases at least a portion of the second transmitting means and couples signals from the first transmitting means to the second transmitting means;
    wherein the plurality of index of refraction altering means are disposed on the encasing means; and
    wherein the controlling means is operable to cause the index of refraction altering mans to effect a grating on the encasing means effective to couple optical signals from the first transmitting means to the second transmitting means.

23. The processing means of claim 21, wherein the plurality of index of refraction altering means each comprise an actuated beam selectively movable into a position adjacent the transmitting means and wherein the controlling means comprises an electronic controller electrically coupled to each of the actuated beams.

24. The processing means of claim 21, wherein the index of refraction altering means comprise a series of parallel electrical strip lines disposed on an electro-optic material disposed on the means for transmitting optical waves and wherein the controlling means comprises an electronic controller electrically coupled to each of the electrical strip lines.

25. A programmable grating comprising:
   an electro-optic material having a refractive index that is a function of applied electromagnetic field;
   a plurality of electrodes positioned to couple an electromagnetic field to the electro-optic material; and
   a controller coupled to the plurality of electrodes, the controller operable to select an operating plurality of the plurality of electrodes and at least one operating voltage for application to the operating plurality to generate a grating in the electro-optic material.

26. The programmable grating of claim 25 wherein the selection of the operating plurality of electrodes in part determines a wavelength of optical energy affected by the grating.

27. The programmable grating of claim 25 wherein the electro-optic material comprises one of liquid crystal and electro-optic polymer.

28. The programmable grating of claim 25 wherein the controller comprises a programmable electronics chip capable of applying different voltages to the plurality of striplines.

29. The programmable grating of claim 25 wherein the plurality of electrodes comprises a plurality of striplines.

30. A method for performing inter-waveguide coupling comprising:
   selectively altering an index of refraction at a plurality of discrete locations outside a first waveguide to effect a grating;
   transmitting an optical signal through the first wave guide; and
   coupling at least a portion of the optical signal through the grating to a second wave guide.

31. The method of claim 30, wherein selectively altering the index of refraction at the plurality of locations outside the first waveguide includes applying voltages to a plurality of strip lines on a surface of electro-optic material optically coupling the first and second waveguides.

32. The method of claim 30, wherein the first and second wave guides are substantially parallel proximate the grating and wherein coupling at least a portion of the optical signal through the grating to the second waveguide further comprises transmitting the at least a portion of the optical signal through the second waveguide in a direction opposite that of the optical signal within the first waveguide.

33. The method of claim 30, wherein selectively altering the index of refraction at the plurality of locations adjacent the first waveguide includes altering the index of refractions at the plurality of locations adjacent the first waveguide to impose a grating on the first waveguide effective to selectively transmit light having a discrete range of wavelengths from the first waveguide to the second waveguide.

34. The method of claim 30, wherein the first and second waveguides have different modal indices and wherein selectively altering the index of refraction at the plurality of discrete locations adjacent the first waveguide to effect the grating includes effecting a grating effective to accomplish phase matching between the first and second waveguides for a discrete range of wavelengths.

* * * * *